United States Patent
Schmidt et al.

(10) Patent No.: US 6,254,807 B1
(45) Date of Patent: *Jul. 3, 2001

(54) CONTROL OF $H_2$ AND CO PRODUCED IN PARTIAL OXIDATION PROCESS

(75) Inventors: Lanny D. Schmidt, Minneapolis, MN (US); Paul M. Witt, Dunbar, WV (US)

(73) Assignee: Regents of the University of Minnesota, Minneapolis, MN (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/005,676

(22) Filed: Jan. 12, 1998

(51) Int. Cl.⁷ ............................... C01B 3/02; C01B 3/16; C01B 31/18
(52) U.S. Cl. ................. 252/373; 252/376; 423/448.2; 423/648.1; 423/652; 423/653; 423/655
(58) Field of Search ................... 252/373, 376; 423/418.2, 650, 652, 648.1, 653, 655

(56) References Cited

U.S. PATENT DOCUMENTS

| | | |
|---|---|---|
| 3,562,797 | 2/1971 | Hu . |
| 3,670,044 | 6/1972 | Drehman et al. . |
| 3,900,646 | 8/1975 | Clyde . |
| 3,957,685 | 5/1976 | Heide et al. . |
| 3,998,758 | 12/1976 | Clyde . |
| 4,087,259 | 5/1978 | Fujitani et al. . |

(List continued on next page.)

FOREIGN PATENT DOCUMENTS

| | | |
|---|---|---|
| 2 004 219 | 5/1990 | (CA) . |
| 0 178 853 | 4/1986 | (EP) . |
| 0 189 282 | 7/1986 | (EP) . |
| 0 332 289 | 9/1989 | (EP) . |
| 0 576 096 | 12/1993 | (EP) . |
| 0 576 096 A2 | 12/1993 | (EP) . |
| 0 640 559 A1 | 3/1995 | (EP) . |
| 0 645 344 | 3/1995 | (EP) . |
| 2 274 284 | 7/1994 | (GB) . |

(List continued on next page.)

OTHER PUBLICATIONS

DOE Grant No. DE–FG02–88ER13878–A02 (1991).
NSF Grant No. CTS–9311295 (not dated).
Hochmuth, "Catalytic partial oxidation of methane over a monolith supported catalyst," *Applied Catalysis B: Environmental*, 1, 89–100 (1992).
S. Bharadwaj et al., "Catalytic partial oxidation of alkanes on silver in fluidized bed and monolith reactors," *Applied Catalysis A: General*, 140, 73–97 (1996).
S. Bharadwaj et al., "Olefins by Catalytic Oxidation of Alkanes in Fluidized Bed Reactors," *Journal of Catalysis*, 155, 403–413 (1995).

(List continued on next page.)

*Primary Examiner*—Wayne Langel
(74) *Attorney, Agent, or Firm*—Mueting, Raasch & Gebhardt, P.A.

(57) ABSTRACT

A process for enhancing $H_2$ or CO production in a partial oxidation reaction by feeding $H_2O$ or $CO_2$ with the feed hydrocarbon and oxygen over a transition metal monolith catalyst such as unsupported Ni monolith or alternatively contacting the hydrocarbon/oxygen first with a noble metal then with a transition metal with the $H_2O$ or $CO_2$ being added before or after the noble metal catalyst. The addition of $H_2O$ suppresses CO and enhances $H_2$ production and the addition of $CO_2$ suppresses $H_2$ and enhances CO production. Little steam or $CO_2$ reforming occurs with the addition of up to 32% $H_2O$ or $CO_2$ respectively. Thus, the ratio of $H_2$:CO which is about 2 in a conventional partial oxidation is manipulated by the addition of either water or $CO_2$ to the partial oxidation.

8 Claims, 4 Drawing Sheets

U.S. PATENT DOCUMENTS

| | | |
|---|---|---|
| 4,088,607 | 5/1978 | Weidenbach et al. . |
| 4,251,239 | 2/1981 | Clyde et al. . |
| 4,253,302 | 3/1981 | Asano et al. . |
| 4,308,233 | 12/1981 | Narumiya et al. . |
| 4,568,595 | 2/1986 | Morris . |
| 4,652,687 | 3/1987 | Imai et al. . |
| 4,767,569 | 8/1988 | Brophy et al. . |
| 4,795,818 | 1/1989 | Becker et al. . |
| 4,810,685 | 3/1989 | Twigg et al. . |
| 4,827,071 | 5/1989 | Hazbun . |
| 4,844,837 | 7/1989 | Heck et al. . |
| 4,863,707 * | 9/1989 | McShea, III et al. ............... 252/373 |
| 4,863,712 | 9/1989 | Twigg et al. . |
| 4,902,849 | 2/1990 | McKay et al. . |
| 4,927,857 | 5/1990 | McShea, III et al. . |
| 4,931,419 | 6/1990 | Blanchard . |
| 4,940,826 | 7/1990 | Font Freide et al. . |
| 5,023,276 | 6/1991 | Yarrington et al. . |
| 5,039,510 * | 8/1991 | Pinto ................................... 423/652 |
| 5,073,657 | 12/1991 | Warren . |
| 5,105,052 | 4/1992 | Font Freide et al. . |
| 5,152,976 | 10/1992 | Fong et al. . |
| 5,217,939 | 6/1993 | Campbell . |
| 5,278,123 | 1/1994 | Chopin et al. . |
| 5,306,684 | 4/1994 | Itoh et al. . |
| 5,374,410 | 12/1994 | Grasselli et al. . |
| 5,382,741 | 1/1995 | Astbury et al. . |
| 5,413,984 | 5/1995 | Marecot et al. . |
| 5,436,383 | 7/1995 | Le Peltier et al. . |
| 5,439,859 | 8/1995 | Durante et al. . |
| 5,500,149 | 3/1996 | Green et al. . |
| 5,593,935 | 1/1997 | Golunski et al. . |
| 5,625,111 | 4/1997 | Astbury et al. . |
| 5,639,401 * | 6/1997 | Jacobs et al. ......................... 252/373 |
| 5,639,929 | 6/1997 | Bharadwaj et al. . |
| 5,648,582 | 7/1997 | Schmidt et al. . |
| 5,654,491 | 8/1997 | Goetsch et al. . |
| 5,658,497 * | 8/1997 | Kumar et al. ......................... 252/373 |
| 5,714,092 * | 2/1998 | Van Looij et al. .................. 252/373 |
| 5,855,815 * | 1/1999 | Park et al. ............................ 252/373 |
| 5,856,585 | 1/1999 | Sanfilippo et al. . |

FOREIGN PATENT DOCUMENTS

| | | |
|---|---|---|
| WO 90/06282 | 6/1990 | (WO) . |
| WO 90/06297 | 6/1990 | (WO) . |
| WO 92/11199 | 7/1992 | (WO) . |

OTHER PUBLICATIONS

S. Bharadwaj et al., "Synthesis Gas Formation by Catalytic Oxidation of Methane in Fluidized Bed Reactors," *Journal of Catalysis*, 146, 11–21 (1994).

S. Bharadwaj et al., "Catalytic partial oxidation of natural gas to syngas," *Fuel Processing Technology*, 42, 109–127 (1995).

L. Schmidt et al., "Catalytic Partial Oxidation Reactions and Reactors," *Chemical Engineering Science*, 49(24A), 3981–3994 (1994).

F. Ragaini et al., "Homogeneous catalysis in water without charged ligands. Reduction of nitrobenzene to aniline by $CO/H_2O$ catalysed by $[Rh(CO)_4]^-$," *Journal of Molecular Catalysis A: Chemical*, 105, 145–148 (1996).

C. Yokoyama et al., "Platinum–tin and platinum–copper catalysts for autothermal oxidative dehydrogenation of ethane to ethylene," *Catalysis Letters*, 38, 181–188 (1996).

A. T. Ashcroft, et al., "Partial oxidation of methane to synthesis gas using carbon dioxide," *Letters to Nature*, 352, 225–226 (1991).

R. Bacaud et al., "Mössbauer Spectra Investigation of the Role of Tin in Platinum—Tin Reforming Catalysts," *Journal of Catalysis*, 69, 399–409 (1981).

T.P. Chojnacki et al., "Microstructures of Pt–Sn and Rh–Sn Particles on $SiO_2$," *Journal of Catalysis*, 129, 473–485 (1991).

V. R. Choudhary, "Energy efficient methane–to–syngas conversion with low $H_2/CO$ ratio by simultaneous catalytic reactions of methane with carbon dioxide and oxygen," *Catalysis Letters*, 32, 391–396 (1995).

F.M. Dautzenberg, "Conversion of n–Hexane over Monofunctional Supported and Unsupported PtSn Catalysts," *Journal of Catalysis*, 63, 119–128 (1980).

D. A. Hickman, et al., "Alternative Catalyst Supports for HCN Synthesis and $NH_3$ Oxidation," *Ind. Eng. Chem. Res.*, 32(5), 809–817 (1993).

M. Huff et al., "Partial oxidation of alkanes over noble metal coated monoliths," *Catalysts Today*, 21, 113–128 (1994).

M. Huff et al., "Ethylene Formation by Oxidative Dehydrogenation of Ethane over Monoliths at Very Short Contact Times," *J. Phys. Chem.*, 97, 11815–11822 (1993).

J.–F. Le Page et al., *Applied Heterogeneous Catalysis*, pp. 90–91 (1987).

T. Matsuda et al., "Dehydrogenation of isobutane to isobutene in a palladium membrane reactor," *Applied CatalysisA: General*, 96, 3–13 (1993).

A.C. Muller, "Surface Study of Platinum–Tin Bimetallic Reforming Catalysts," *Journal of Catalysts*, 56, 65–72 (1979).

E. Ruckenstein et al., "Role of Support in $CO_2$ Reforming of $CH_4$ to Syngas over Ni Catalysts," *Journal of Catalysis*, 162, 230–238 (1996).

P.M. Torniainen et al., "Comparison of Monolith–Supported Metals for the Direct Oxidation of Methane to Syngas," *Journal of Catalysis*, 145, 1–10 (1994).

H. Verbeek et al., "The Study of the Alloys of Platinum and Tin by Chemisorption," *The Journal of Catalysis*, 42, 257–267 (1976).

P.M. Torniainen et al., "Comparison of Monolith–Supported Metals for the Direct Oxidation of Methane to Syngas," *Journal of Catalysis, 146*, 1–10, (1994).

* cited by examiner

CONTROL OF H₂ AND CO PRODUCED IN PARTIAL OXIDATION PROCESS

BACKGROUND OF THE INVENTION

1. Field of the Invention

The present invention relates to a process and apparatus for production of $H_2$ or CO by the partial oxidation of hydrocarbons, preferably methane. In particular the partial oxidation is carried out in the presence of water or carbon dioxide under water-gas shift reaction conditions. The invention was made with government support under DOE Grant No. DE-FG02-88ER13878-A02. The government has certain rights in the invention.

2. Related Art

Catalytic steam reforming of methane is currently the main industrial process to produce synthesis gas (CO and $H_2$). The steam reforming reaction may be represented as:

$$CH_4 + H_2O \rightarrow CO + 3H_2$$

Reforming is highly endothermic, requiring energy input and also requiring contact times on the order of seconds. The resultant high $H_2/CO$ ratio is also unsuitable for methanol and Fischer-Tropsch synthesis. Therefore additional downstream reactors are usually required to adjust this ratio by water-gas shift reaction at contact time of ≈1 second as:

$$CO + H_2O + H_2 + CO_2$$

Partial oxidation, on the other hand, is an exothermic reaction which can be represented by the reaction of methane with oxygen as follows:

$$CH_4 + \tfrac{1}{2}O_2 \rightarrow CO + 2H_2$$

To produce synthesis gas by steam reforming, high temperature heat input is primarily required at two process steps. First, sufficient steam at a high temperature and high pressure must be generated for mixing with the hydrocarbon feedstock and, second, the steam reforming of the steam and hydrocarbon mixture must take place at relatively high temperatures and pressures through a bed of solid catalyst. The equipment needed for these two heat transfers at high temperature and high pressure is necessarily quite expensive. The equipment for the steam reforming step is also costly because it must be adapted to permit the changing of the solid catalyst when that catalyst is spent or poisoned. Heat sources appropriate for the above two process steps are typically provided by fired heaters at high, continuing utility costs, also with high fluegas $NO_x$ production consequential to the high temperatures required in the furnace firebox.

The production of synthesis gas by partial oxidation is considered a desirable alternative to steam reforming since it overcomes some of the problems of steam reforming, see for example PCT publication WO 90/06282 and WO 90/06297. U.S. Pat. No. 4,844,837 to Heck et al discloses a catalytic partial oxidation method for methane using a monolith catalyst with platinum-palladium, palladium-rhodium, or platinum-rhodium coatings. U.S. Pat. No. 4,087,259 to Fujitani et al describes a monolith catalyst with a rhodium coating to perform catalytic partial oxidation on gasoline and heavier petroleum fractions. U.S. Pat. No. 5,648,582 to Schmidt et al discloses the partial oxidation of methane at short residence times using metal deposited on a ceramic monolith.

In these conventional partial oxidations, methane (natural gas) is converted to high purity $H_2$ and CO with a mole ratio of $H_2:CO$ ≈2.0, which is the desired feed ratio for methanol and Fischer-Tropsch plants. However, many other applications require different ratios of $H_2:CO$. The present synthesis gas shift reactor modifies the prior processes to obtain either high purity $H_2$ or CO.

Recent advancements in fuel cell technology have spurred an interest in converting natural gas into hydrogen. Pure hydrogen streams can be produced by steam reforming followed by high temperature shift using an Fe based catalyst, and low temperature shift using a Cu based catalyst. For natural gas to be an effective $H_2$ source for fuel cells, the present natural gas conversion technology must be simplified, preferably to a single, highly selective small catalytic reactor. Other applications include acetic acid production, which requires pure CO feeds. We have discovered that the $H_2:CO$ product ratio can be altered by the addition of $CO_2$ or $H_2O$ through the water-gas shift reaction while the conversion of $CH_4$ remains constant, indicating negligible reforming is occurring.

SUMMARY OF THE INVENTION

Briefly, the present invention is a process for the partial oxidation of hydrocarbons such as methane (natural gas) by contacting a feed containing the hydrocarbon and oxygen and $H_2O$ or $CO_2$ through a catalyst zone containing a catalytically effective amount of at least one transition metal monolith catalyst under partial oxidation conditions. A preferred monolith catalyst is a nickel metal monolith. When $H_2O$ is fed, the product shifts toward the $H_2$ and when $CO_2$ is present the product shifts toward CO, thus the presence of either water or $CO_2$ provides the means to adjust the $H_2:CO$ ratio, preferably in the range of more than about 2 to about 6 when water is added and in the range of less than about 2 to about 0.5 when $CO_2$ is added. It appears that the presence of water or $CO_2$ in the reaction zone according to the present invention produces a water-gas shift rather than reforming.

In a further embodiment the process comprises a first contacting a feed comprising methane and oxygen feed with or without $H_2O$ or $CO_2$ with a noble metal coated onto a monolith. The $H_2O$ or $CO_2$ may be fed through the noble metal monolith or between the noble metal monolith and the transition metal monolith.

Because partial oxidation reactions are exothermic, it is not necessary to add external heat to the system other than to obtain ignition of the catalyst.

DETAILED DESCRIPTION

The present catalyst is comprised of a monolith structure either composed of the metal of the catalyst or coated with the metal of the catalyst. The metals may be in the oxide form during use in the present process. The thickness of the monolith through which the feed gas mixture must pass is from 1 mm to 2 cm. Catalyst contact time ranges from 0.1 to 20 milliseconds when using a monolith of 50% porosity and 0.2 to 1 cm in depth. Under operating conditions, this corresponds to Gas Hourly Space Velocity (GHSV) of 60,000 to 3,000,000 $hr^{-1}$.

Ceramic foam monoliths have been found in the present invention to create the superior mass transfer characteristics necessary if high space velocities are to be used. The metal monolith may be prepared as metal foam or sintered particles of metal. The solid metal monoliths exhibit superior heat transfer properties but may require substantial amounts of very expensive metals in some embodiments. Thus, in some applications the metal coated ceramics will be the catalyst of choice. As used herein the term "metal monolith" shall include both the solid metal monoliths and the metal coated ceramic monoliths. The solid metal monoliths may be produced by any method, for example foaming, sintering and fusing.

The reactor is started from ambient temperature through the use of a mixture of light hydrocarbons or ammonia and air preheated to about 200° C. and then introduced to the monolith catalyst at an appropriate temperature at which combustion will occur. After combustion has established a monolith catalyst temperature of near 1000° C., preheat and ammonia is stopped. The feed gas mixture of hydrocarbons (methane) and oxygen is then fed to the catalyst zone at a temperature of from 25° to 450° C. Thus, the gas feed mixture of the present invention does not require preheating to near its ignition temperature prior to introduction to the catalyst, thereby avoiding the production of $CO_2$ and $H_2O$ and the concurrent reduction of the selectivity for $H_2$ and CO. With the introduction of water or carbon dioxide to the reaction in accordance with the present invention, the preheat of the feed is adjusted to maintain the established outlet temperature.

The amounts of hydrocarbon, $H_2O$, $CO_2$ and oxygen introduced into the partial oxidation (catalyst zone) are controlled to provide $O_2$:C ratios of from about 0.2 to 0.8 and $H_2O$ or $CO_2$:C ratios of about 0.5 to 5. The process is carried out from about atmospheric pressure to about 2000 psig. The amount of water or $CO_2$ added is preferably up to 45%, more preferably 5 to 35% of the gaseous feed.

Because the hydrocarbon conversion remains constant with or without the $H_2O$ or $CO_2$ it appears that little or no reforming is occurring. Thus the present partial oxidation in the presence of $H_2O$ or $CO_2$ is characterized as occurring in the substantial absence of reforming. The predominant reaction in the presence of water or $CO_2$ is characterized as a water-gas shift reaction.

In a preferred embodiment of the present invention, catalytic partial oxidation, an exothermic reaction, takes place in a catalyst monolith having a specified transition metal alone or preceded by a noble metal dispersed to produce a gas which is rich in carbon monoxide and hydrogen. The reaction in the catalytic partial oxidation zone is exothermic and the zone is therefore also referred to as an exothermic catalyst zone. The exothermic, catalytic partial oxidation zone comprises either solid metal monolith and/or a monolithic catalyst carrier or carriers on which transition or transition and noble metal catalyst is dispersed. Such catalyst can effectively catalyze the partial oxidation of, in addition to, gaseous and lighter hydrocarbon liquids such as natural gas or paraffinic naphtha, heavier hydrocarbon liquids such as diesel oil, number 2 fuel oil, and coal derived liquids. As compared to a non-catalytic combustion process such as conventional, non-catalytic partial oxidation, catalytic partial oxidation as described above enables the utilization of lesser amounts of oxygen and lower temperature levels to both oxidize a portion of the feed and crack heavier feedstocks to lighter hydrocarbon fractions while raising the temperature of the reactant mass for subsequent treatment. Generally, at least about half the hydrocarbon feed stock is partially oxidized in the catalytic partial oxidation zone to produce primarily carbon monoxide and hydrogen and heat. Substantially all of the oxygen introduced into the catalytic partial oxidation zone is consumed in the partial oxidation step. The oxygen introduced into the catalytic partial oxidation zone is consumed in the catalytic partial oxidation step. The oxygen may be provided by any suitable "oxygen-containing oxidant gas" which term is used in the claims to include air, air enriched with oxygen, oxygen or oxygen mixed with other gases. The effluent gas from the catalytic partial oxidation zone contains primarily CO, $H_2$, $H_2O$, $N_2$, $C_2$ to $C_4$ and other lighter hydrocarbons, including olefins, and, depending upon the sulfur content of the feedstock, $H_2S$ and COS. Methane is the preferred feed for $H_2$ or CO production.

The presence of $H_2O$ (steam) results in a favorable shift in the product of the $H_2$:CO ratio to $H_2$, whereas the presence of $CO_2$ shifts the ratio in favor of CO.

The combination of features provided by the present invention provides a highly efficient and flexible method of converting various types of hydrocarbonaceous feeds to a hydrogen-rich gas. For example, the combination of features provided by the process of the present invention provides a highly efficient process of manufacturing a synthesis gas by converting various types of hydrocarbonaceous feeds, including hydrocarbon feeds, to a nitrogen and hydrogen-rich gas suitable for use in ammonia synthesis. By utilizing the catalytic partial oxidation process as described, a wide variety of hydrocarbonaceous feeds may be efficiently and economically converted into a hydrogen-rich gas.

The Monolithic Partial Oxidation Catalysts

The partial oxidation catalyst either comprises or is supported on a monolithic carrier, that is, a carrier of the type comprising one or more monolithic bodies having a plurality of finely divided gas flow passages extending therethrough. Such monolithic carrier members are often referred to as "honeycomb" type carriers and are well known in the art. A preferred form of such carrier is made of a refractory, substantially inert, rigid material which is capable of maintaining its shape and a sufficient degree of mechanical strength at high temperatures, for example, up to about 3,373° F. (1,856° C.). Typically, a material is selected for the support which exhibits a low thermal coefficient of expansion, good thermal shock resistance and, though not always, low thermal conductivity. Two general types of material for construction of such carriers are known. One is a ceramic-like porous material comprised of one or more metal oxides, for example, alumina, alumina-silica, alumina-silica-titania, mullite, cordierite, zirconia, zirconia-spinal, zirconia-mullite, silicon carbide, etc. A particularly preferred and commercially available material of construction for operations below about 2,000° F. (1,093° C.) is cordierite, which is an alumina-magnesia-silica material. For applications involving operations above 2,000° F. (1,093° C.) an alumina-silica-titania material is preferred. Honeycomb monolithic supports are commercially available in various sizes and configurations. Typically, the monolithic carrier would comprise, e.g., a cordierite member of generally cylindrical configuration (either round or oval in cross section) and having a plurality of parallel gas flow passages or regular polygonal cross section extending therethrough. The gas flow passages are typically sized to provide from about 50 to 1,200, preferably 200 to 600, gas flow channels per square inch of face area.

Various honeycombed (reticulated) ceramic structures are described in the art: U.S. Pat. No. 4,251,239 discloses fluted filter of porous ceramic having increased surface area; U.S. Pat. No. 4,568,595 discloses honeycombed ceramic foams with a surface having a ceramic sintered coating closing off the cells; U.S. Pat. No. 3,900,646 discloses ceramic foam with a nickel coating followed by platinum deposited in a vapor process; U.S. Pat. No. 3,957,685 discloses nickel or palladium coated on a negative image ceramic metal/ceramic or metal foam; U.S. Pat. No. 3,998,758 discloses ceramic foam with nickel, cobalt or copper deposited in two layers with the second layer reinforced with aluminum, magnesium or zinc; U.S. Pat. No. 4,863,712 discloses a negative image honeycombed (reticulated) foam coated with cobalt, nickel or molybdenum coating; U.S. Pat. No. 4,308,233 discloses a reticulated ceramic foam having an activated alumina coating and a noble metal coating useful as an exhaust gas catalyst; U.S. Pat. No. 4,253,302 discloses a foamed ceramic containing platinum/rhodium catalyst for exhaust gas catalyst; and U.S. Pat. No. 4,088,607 discloses a ceramic foam having an active aluminum oxide layer coated by a noble metal containing composition such as zinc oxide, platinum and palladium.

The foam structure is characterized by the number of pores per linear inch and typical foams are produced with 10 to 100 pores per linear inch. The ceramic supports employed in the present invention are generally of the type disclosed in U.S. Pat. No. 4,810,685 using the appropriate material for the matrix and are generally referred to in the art and herein as "monoliths".

Generally any organic liquid in which the metal salt is soluble may be used to deposit metals on to monolith supports. The metals may also be deposited from aqueous solutions using the water soluble salts.

Generally from 0.5 to 20 wt % of the metal will be deposited on the monolith (based on the weight of monolith).

A suitable high surface area refractory metal oxide support layer may be deposited on the carrier to serve as a support upon which finely dispersed catalytic metal may be distended. As is known in the art, generally, oxides of one or more of the metals of Groups II, III, and IV of the Periodic Table of Elements having atomic numbers not greater than 40 are satisfactory as the support layer. Preferred high surface area support coatings are alumina, beryllia, zirconia, baria-alumina, magnesia, silica, and combinations of two or more of the foregoing.

The most preferred support coating is alumina, most preferably a stabilized, high-surface area transition alumina. One or more stabilizers such as rare earth metal oxides and/or alkaline earth metal oxides may be included in the transition alumina (usually in amounts comprising from 20 to 10 weight percent.

The metal monolith may be prepared as metal foam or sintered particles of metal at high temperature. Monolithic supports may also be made from materials such as nickel or stainless steel by placing a flat and a corrugated metal sheet, one over the other, and rolling the stacked sheets into a tubular configuration about an axis parallel to the corrugations, to provide a cylindrical-shaped body having a plurality of fine, parallel gas flow passages extending therethrough.

The transition metals useful in the present invention are selected from the groups consisting of Fe, Os, Co, Rh, Ir, Ni Cu, Pd, Pt and mixtures thereof, with Fe, Co, Ni or Cu forming a preferred grouping, more preferably Ni and more preferably as a solid nickel monolith. Nickel supported on alumina monoliths was not found to be useful in the present process.

The noble metals useful in the present invention are selected from the group consisting of Ru, Rh, Pd, Pt and mixtures thereof preferably Pt or Pd.

For FIGS. 1–10 runs were carried out in a quartz tube continuous reactor with 18 mm diameter. Identical $\alpha$-$Al_2O_3$ monoliths without metal were positioned before and after the catalyst to reduce radiation losses. The catalyst and radiation shields were sealed in the quartz reactor by silica-alumina cloth. The temperatures of the front and back sides of the catalyst were measured with Pt—Pt/Rh thermocouples placed between the catalyst and the radiation shields. Rh and Pt catalysts were ignited with a Bunsen burner at a $CH_4/O_2$ ratio of 1.8. The fresh Ni spheres were more difficult to ignite, and therefore $NH_3$ was added to the feed to lower ignition temperature. After ignition, the reactor was insulated by wrapping it in high temperature insulation.

Rh and Pt catalysts were prepared by impregnating $\alpha$-$Al_2O_3$ foam monoliths (18 mm diameter by 10 mm long) with concentrated metal salt solutions (rhodium chloride in acetone or chloroplatinic acid in $H_2O$) which were added dropwise to the monolith and allowed to dry overnight. The samples were further dried at 390 K for 2 hours and then calcined at 870° K. for 2 hours in He and reduced at the same temperature in 10% $H_2$/Ar for 7 hrs. However, spheres of sintered Ni activated over a period of 6 hours (at normal reaction conditions) catalyzed an oxidation reaction in which the conversion and selectivities steadily increased. Therefore pure sintered Ni metal spheres (Alfa, −40 mesh, deposition grade, 99.9%) packed to 1 cm deep were used directly. Similar results were obtained with foamed nickel monolith.

Flow rates of high purity $O_2$, $N_2$, $CO_2$ and $CH_4$ were controlled by mass flow controllers with an accuracy of ±0.01 standard liters per minute (slpm). Initial experiments with no $CO_2$ or $H_2O$ added to the feed were conducted at 4 slpm, $CH_4/O_2$=1.8 and 35% dilution, which is optimal fuel/oxygen ratio for syngas production. For all of the $CO_2$ results presented here, the $N_2$ was replaced by $CO_2$ to maintain a constant contact time within the catalyst. The exit temperature of the catalyst was held constant by preheating the feed gases. Runs were repeated where $CO_2$ was added to a constant flow of $CH_4$, $O_2$ and $N_2$. These results are nearly identical and show the same trends as the data presented here and are omitted. For runs in which steam was added to the feed, water was supplied by a syringe pump through a two stage vaporizer and a back pressure regulator to eliminate system pulsing. In all results reported, $H_2O$ was added to a constant flow of $CH_4$, $O_2$ and $N_2$.

Product gases were analyzed by a HP 5890 gas chromatograph with a thermal conductivity detector and integrated by an on-line computer. The detected reaction products were $H_2$, CO, $CO_2$ and $H_2O$ on all catalysts, and over Pt up to 1% $C_2$ products were observed. $CH_4$ conversion and products selectivities were calculated as described previously. For $CO_2$ addition, the selectivities to CO and $CO_2$ are not reported (the only carbon containing product that is not a reactant is CO). Similarly $H_2$ and $H_2O$ selectivities are not reported for $H_2O$ addition. In all runs the carbon and hydrogen balances closed with an accuracy better than 97%.

Figure 1:
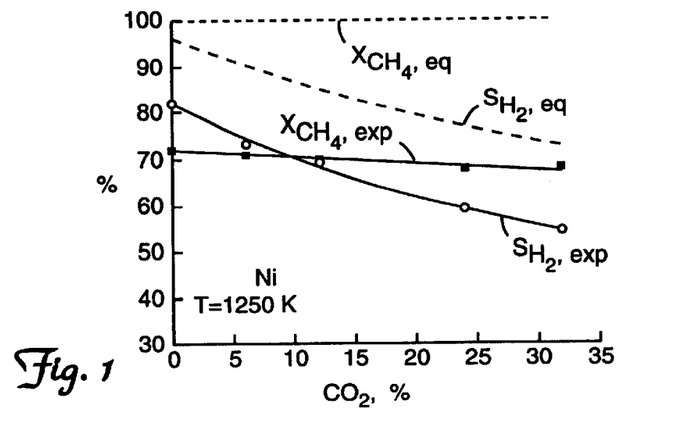
FIG. 1 shows the conversion of $CH_4$ and selectivities to $H_2$ with $CO_2$ addition over Ni.
Figure 2:
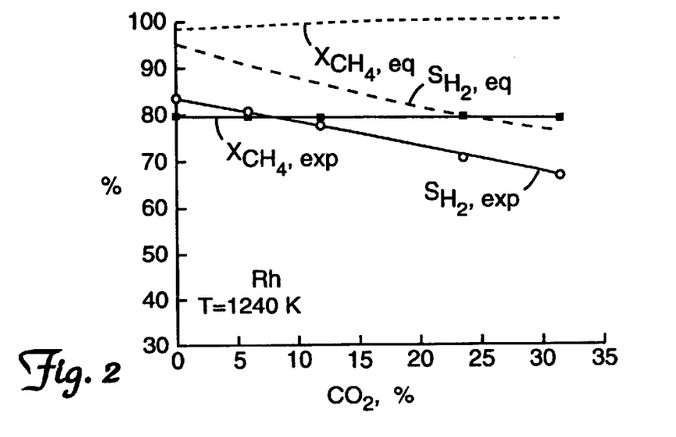
FIG. 2 shows the conversion of $CH_4$ and selectivities to $H_2$ with $CO_2$ addition over Rh.
Figure 3:
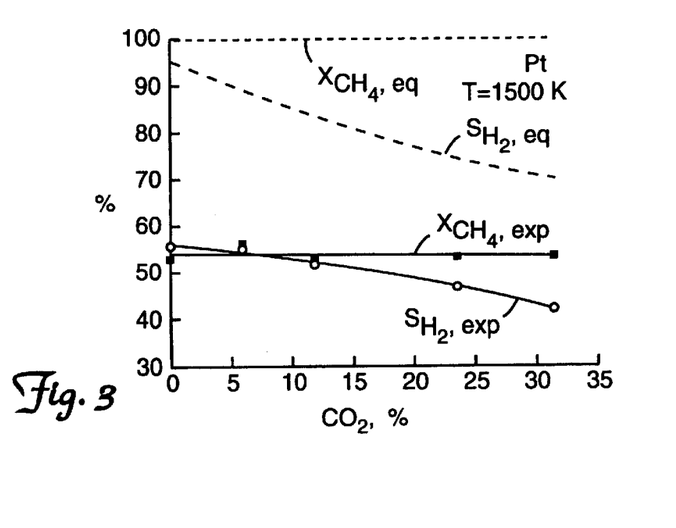
FIG. 3 shows the conversion of $CH_4$ and selectivities to $H_2$ with $CO_2$ addition over Pt.

FIGS. 1-3 show the conversions of $CH_4$ and selectivities to $H_2$ with $CO_2$ addition on Ni, Rh and Pt catalysts. The reaction temperatures on Ni, Rh and Pt catalysts were held constant with $CO_2$ addition, 1240°, 1250° and 1500° K., respectively. The equilibrium predictions of $CH_4$ conversion and $H_2$ selectivities at these temperatures are shown by the dashed lines. Since Pt produces a lower $H_2/H_2O$ ratio, its temperature is ~250° C. hotter than Ni or Rh.

The $CH_4$ conversions were nearly constant up to 30% $CO_2$ addition on all three catalysts, but significantly lower than the equilibrium $CH_4$ conversions which is nearly 100%. These results imply that little $CO_2$ reforming of $CH_4$ occurs at contact times of ≈5 ms and ≈1300° K. FIG. 1 also shows that the conversion of $CH_4$ is higher on Rh (80%) than on Ni (72%) with Pt (54%) being much less active.

The addition of $CO_2$ decreases the selectivity to $H_2$ over all three catalysts, but to very different amounts. With 24% $CO_2$ addition on Ni, the $H_2$ selectivity decreases from 80% to 55%, on Rh it decreases from 84% to 67%, and on Pt it decreases from 59% to 41%. The $H_2$ selectivities are roughly parallel to, but lower than, the calculated equilibrium $H_2$ selectivities. These results indicate that $CO_2$ reacts with $H_2$ in the reverse water-gas shift reaction to a greater extent on Ni and least on Pt. Addition of $H_2O$.

Figure 4:
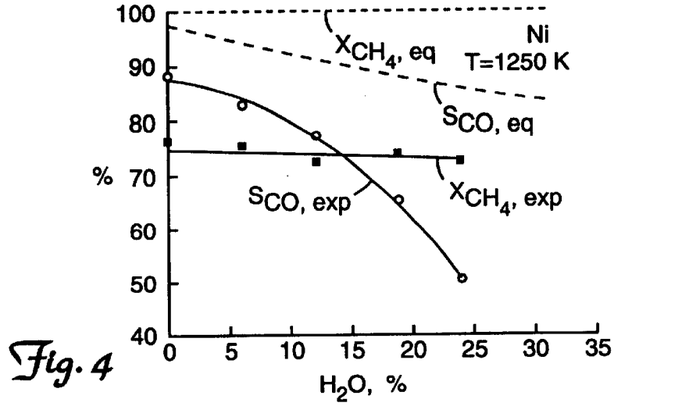
FIG. 4 shows the conversion of $CH_4$ and selectivities to CO with $H_2O$ addition over Ni.
Figure 5:
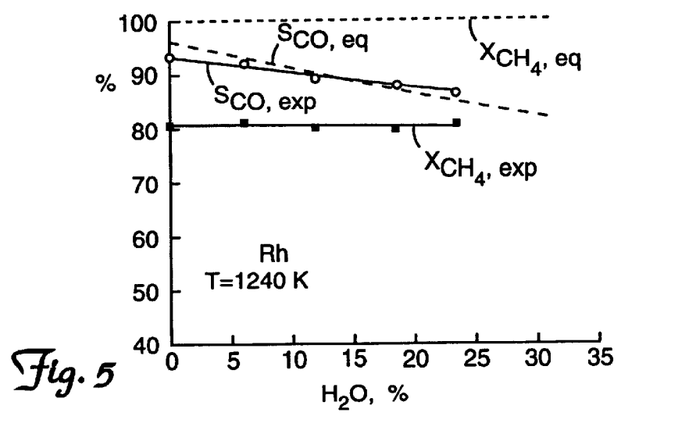
FIG. 5 shows the conversion of $CH_4$ and selectivities to CO with $H_2O$ addition over Rh.
Figure 6:
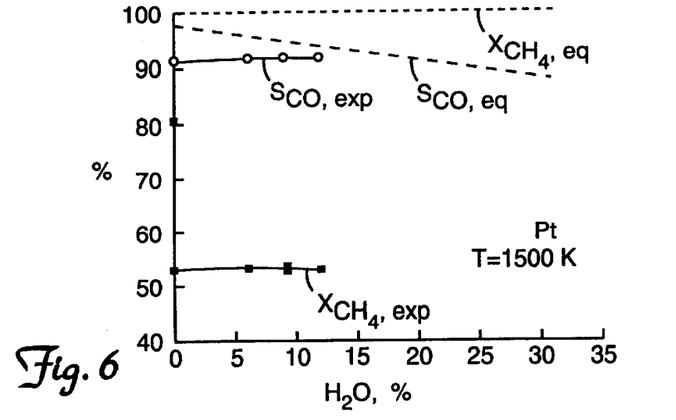
FIG. 6 shows the conversion of $CH_4$ and selectivities to CO with $H_2O$ addition over Pt.
Figure 7:
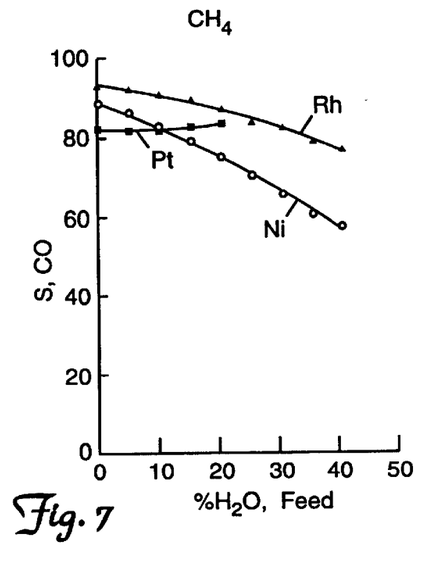
FIG. 7 compares the selectivity to CO in the product with the addition of $H_2O$ over Ni, Rh, and Pt.
Figure 8:
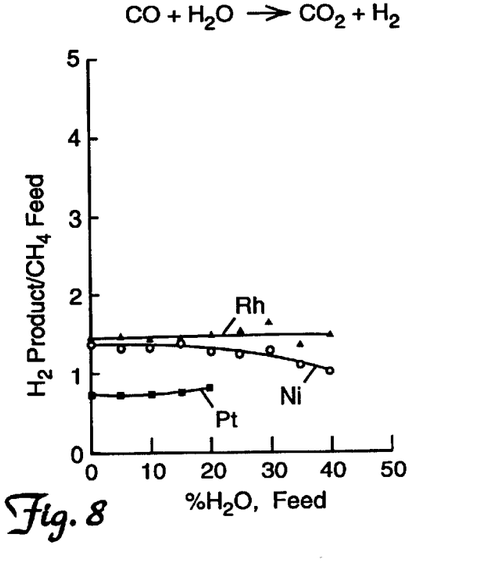
FIG. 8 compares the ratio of the $H_2$ in the product to the $CH_4$ in the feed with the addition of $H_2O$ over Ni, Rh, and Pt.
Figure 9:
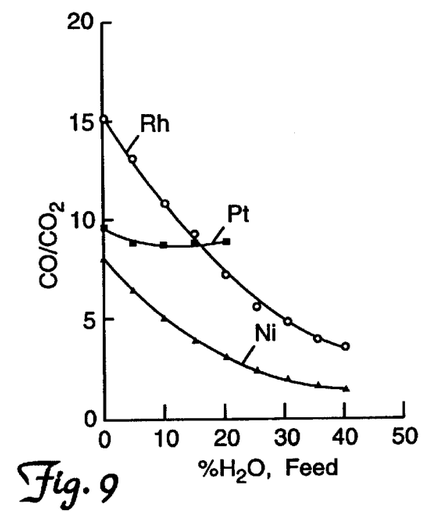
FIG. 9 compares the ratio of $CO/CO_2$ in the product with the addition of $H_2O$ over Ni, Rh and Pt.
Figure 10:
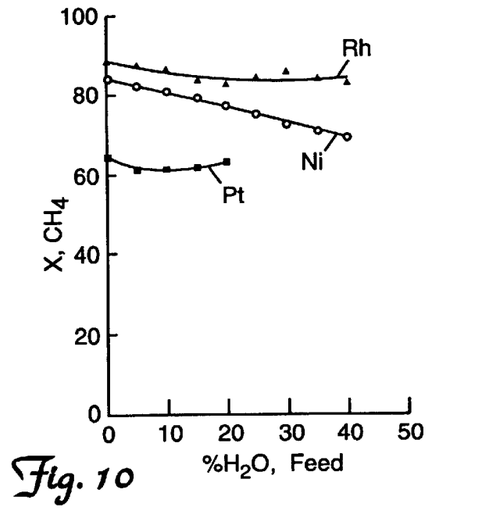
FIG. 10 compares the conversion of $CH_4$ with the addition of $H_2O$ over Ni, Rh, and Pt.

The results of $H_2O$ addition with a constant flow of $CH_4$, $O_2$, and $N_2$ over Ni, Rh or Pt are shown in FIGS. 4-6. In these runs, the temperature was kept constant at the adiabatic temperature in the absence of $H_2O$ by preheating the gas stream. Because of preheat limitations, maintaining a constant temperature on the Pt catalyst at greater than 12 Vol % $H_2O$ feed was difficult and therefore is not reported.

FIGS. 4-6 show that the $CH_4$ conversions were nearly constant over the entire range of $H_2O$ addition on all three catalysts, indicating that negligible steam reforming of $CH_4$ is occurring under these conditions.

As $H_2O$ is added to the feed the selectivity to CO decreases on Ni and Rh but remains essentially constant over Pt. On Ni, the selectivity to CO decreases from 88% to 50% while on Rh the selectivity only drops from 94% to 87%. The $H_2O$ seems to be reacting with CO by the water-gas shift reaction over Ni and Rh but not over Pt.

The present results exhibited no catalyst deactivation on unsupported Ni and on supported Pt and Rh for over 100 hours of operation at atmospheric pressure. The present data also show that as the concentration of $CO_2$ in the feed increases, the conversion of $CH_4$ remains constant. This clearly shows that $CO_2$ reforming is not occurring significantly at temperatures near 1300° K., at contact times near 1 ms and in the presence of oxygen.

Although these results may seem contradictory to previous literature, three distinct factors differentiate this work from previous results. First, the present reactor runs adiabatically and autothermally, therefore the reaction temperature is controlled by the catalyst selectivity and the temperatures typically run 250 to 500° hotter than typical $CO_2$ reforming runs. Second, the contact time over the catalyst in our runs is approximately 1 ms, corresponding to a gas hourly space velocity GHSV of ~1×10$^5$ h$^{-1}$, which is approximately a factor of 10 higher than most previous $CO_2$ reforming work. Finally, the presence of $O_2$ may inhibit $CO_2$ reforming reactions. The $CH_4$ is probably reacting with $O_2$ very rapidly, and the extremely short contact times prevent the remaining $CH_4$ from reacting with $CO_2$.

Similar results have been reported by Choudhary et al, Catal. Lett. 32 (1995) 391-396 over NiO—CaO catalyst at space velocities of up to 5×10$^5$ cm$^3$ g$^{-1}$ h$^{-1}$ and temperatures up to 900° C. For $CO_2$ reforming in the absence of $O_2$, the NiO—CaO catalyst coked very rapidly, but when $O_2$ is added to the feed, the catalyst showed no deactivation due to coke formation. They used their results to show that the addition of $O_2$ overcomes the endothermic limitations of $CO_2$ reforming by initially combusting part of the $CH_4$. The energy released by combustion can then be immediately used to drive the reforming reactions. They confirmed this by calculating the ratio of $CO_2$ reforming to oxidative conversion of $CH_4$ based on the chemistry being controlled by three reactions: 1) partial oxidation of $CH_4$ with $O_2$ to syngas, 2) complete combustion of $CH_4$, 3) and $CO_2$ reforming of $CH_4$.

Although, this may be a valid explanation of the product distribution in these experiments, it is believed that present results are better described by the direct oxidation of $CH_4$ to syngas followed by water-gas shift. FIGS. 1-3 show that as $CO_2$ is added to the feed, the conversion of $CH_4$ does not change when the outlet temperature is held constant, for example by preheating the feed, indicating that $CO_2$ reforming of $CH_4$ is probably not active at these contact times and temperatures. However, as $CO_2$ is added the selectivity to $H_2$ decreases over all three metals. This implies that $CO_2$ is reacting with $H_2$ in the reverse water-gas shift.

The present results show that the water-gas shift reaction is being affected by the addition of $H_2O$, particularly over the Ni monolith. $H_2O$ seems to be reacting with CO in the forward water-gas shift to form $CO_2$ and $H_2$. The combination of the $CO_2$ and $H_2O$ addition results strongly confirm the activity of the water-gas shift reaction and its reverse at >1000° K. and 1 ms contact time.

As with $CO_2$ reforming, steam reforming seems to be inactive over Ni, Rh or Pt at high temperatures and millisecond contact times. This is probably because the $CH_4$ preferentially reacts with $O_2$ first, and the remaining $CH_4$ does not react with the $H_2O$ at these extremely short contact times. This is expected from the relatively low sticking coefficients of $CO_2$ and $H_2O$ compared to $O_2$.

The present results show that addition of $CO_2$ or $H_2O$ to the feed stream affects the selectivity to $H_2$ and CO but leaves the conversion of $CH_4$ unaffected. The short contact times, 10 to 10 ms, do not allow significant $CO_2$ or steam reforming on any of the three metals, and the dominant reaction is the direct oxidation of $CH_4$ to CO and $H_2$.

Since the $H_2$ selectivity decreases with the addition of $CO_2$ (or CO selectivity decreases with the addition of $H_2O$), the water-gas shift reaction or its reverse must be active at present reaction temperatures and contact times. Therefore, it is believed that the direct partial oxidation of $CH_4$ to syngas followed by the water-gas shift reaction are the dominant reactions in the present invention.

FIGS. 1–6 show that at contact times near 1 ms, the direct partial oxidation of methane to syngas appears to be followed by water-gas shift or its reverse. Because the water-gas shift reaction is active at 1300° K. and 1 ms, the product selectivities can be tuned from high CO to high $H_2$ content by introducing $CO_2$ or $H_2O$ respectively into the feed stream.

The negligible steam or $CO_2$ reforming occurs in the presence of $O_2$ over unsupported Ni and $\alpha$-$Al_2O_3$ supported Rh and Pt catalysts at contact times of 1–10 ms and 1300 K. However, the water-gas shift reaction and the reverse shift reaction are active over Ni and Rh, with Pt being less active. Over Ni, the $CO/CO_2$ ratio decreases to 1 at 30% $H_2O$ addition, which tranlates to a $H_2/CO$ ratio of 5. This demonstrates the addition of $H_2O$ or $CO_2$ can be used to manipulate the ratio of $H_2/CO$ in the product stream.

Figure 11:
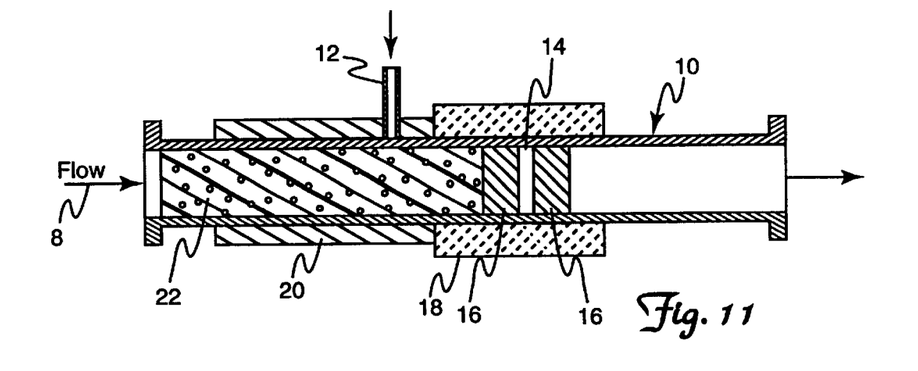
FIG. 11 discloses a single bed catalyst reaction system according to the present invention.

In FIG. 11 an apparatus with a single transition metal catalyst is illustrated. Hydrocarbon/$O_2$ flow 8 is in the direction of the arrow into tubular reactor 10. $H_2O$ (as steam) or $CO_2$ enters via line 12 into a bead packing 22. The tubular reactor 10 is wrapped with heating tape and the catalyst 14 is sandwiched between two heat shields 16 and insulated by 18.

Figure 12:
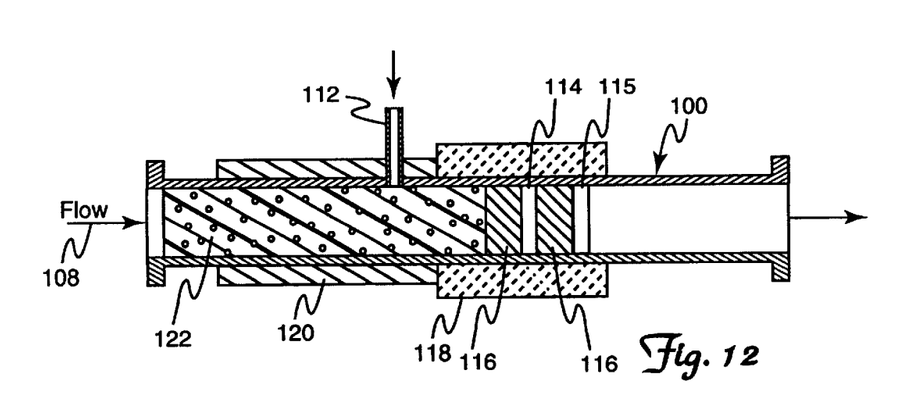
FIG. 12 discloses a multibed catalyst reaction system according to the present invention.

In FIG. 12 an apparatus with a multi-catalyst zone is shown in tubular reactor 100. Hydrocarbon/$O_2$ feed enters 108 in the direction of the arrow to flow through the reactor. $H_2O$ (steam) or $CO_2$ enter into beads 122 via 112 and the mixture contacts noble metal catalyst 114 then transition metal (preferred group) 115. The two catalyst monoliths are associated with heat shields 116 and insulated by 118. The front portion of the reactor containing the beads is wrapped with heating tape 120.

Figure 13:
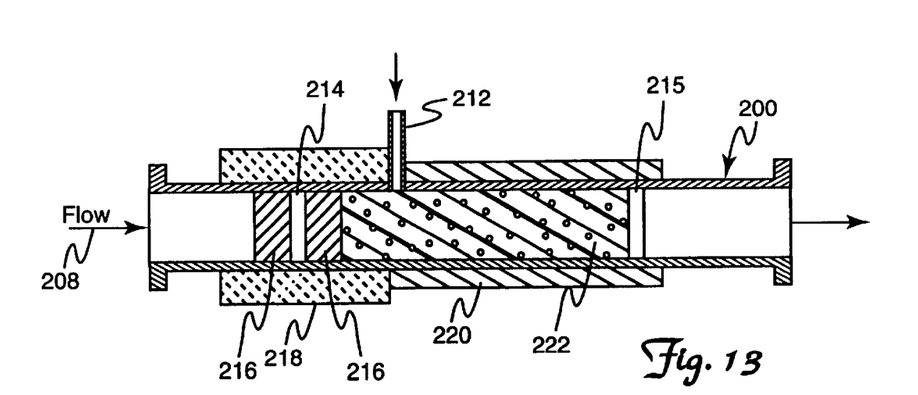
FIG. 13 discloses an alternative multibed catalyst reaction system according to the present invention.

FIG. 13 is a modification of the apparatus of FIG. 12. The hydrocarbon/$O_2$ feed 208 enters the tubular reactor 200 and passes through noble metal monolith catalyst 214 which is sandwiched between heat shields 216. That section is insulated by 218. The reaction has been initiated by igniting the catalyst 214. The product from this partial oxidation passes into the bead packing 222 where it mixes with $H_2O$ (steam) or $CO_2$ entering via 212. The mixture proceeds through transition metal (preferred group) monolith catalyst 215. Heating tape is provided to maintain the temperature from the exothermic partial oxidation.

It has been found that unsupported metal monoliths such as nickel monolith is advantageous over ceramic supported metals. Because of the high thermal conductivity of Ni, the monolith is a better thermostat and higher flow rates can be achieved with similar selectivities and conversions. By using unsupported Ni, the possibility of nickel-aluminate formation and therefore a deactivation route is eliminated. These two advantages combined allow for operation over wider range of inlet conditions.

The multiple catalyst bed design takes advantage of a more selective catalyst for synthesis gas formation. In this design the first bed is a supported noble metal catalyst, preferably Rh. This catalyst is supported by a reticulated or extruded ceramic structure and the weight loadings of catalyst can range from 0.1% to in excess of 10%. Steam or $CO_2$ is injected immediately following the first catalyst bed prior to entering the second bed. The second bed requires energy input to maintain reaction. This catalyst can be a noble metal, transition metal or metal oxide, like Ni, Fe, or Cu.

To initiate reaction, the feed gases are introduced to the reactor at the desired flow rate and composition. Energy is added to the catalyst either electrically or thermally until the catalyst ignites. After catalyst ignition the energy source is removed, and preheat is the only external energy source required to maintain reaction temperatures between 800° and 1000° C. For the multi-bed reactor, the second and beyond stages may need to be maintained at temperature either by external heating or from the energy released in the first stage.

Gas hourly space velocities $-10^5$ $h^{-1}$ have been used for the process. Inlet compositions of fuel and oxygen were taken from literature sources for the optimal production of synthesis gas. Natural gas was simulated by $CH_4$, the dominant component of natural gas. The inlet compositions ranged from 64% fuel, 36% oxidant to 35% fuel, 20% oxidant and 45% $H_2O$ or $CO_2$.

The introduction of $H_2O$ into the feed stream results in a decrease in the $CO/CO_2$ ratio. With no $H_2O$ the $CO:CO_2$ ratio is 8:1, but with 40% $H_2O$ feed the ratio is reduced to 1.3:1 when using an unsupported bed of nickel. Adding $CO_2$ instead of $H_2O$ results in a decrease in the $H_2$:$H_2O$ ratio from 9:1 to 1:1 again over a nickel catalyst. Similar results have been demonstrated over Rh and Pt catalysts.

The invention claimed is:

1. A process for controlling the $H_2$ and CO concentrations produced in a hydrocarbon partial oxidation process comprising:

feeding a stream comprising a hydrocarbon and oxygen through a first catalyst zone comprising at least one noble metal monolith catalyst and a second catalyst zone comprising a nickel metal monolith catalyst, wherein the noble metal is selected from the group consisting of Ru, Rh, Pd, Ir, and Pt; and feeding $H_2O$ to the stream to control the amounts of $H_2$ and CO produced;

wherein the overall process occurs in the substantial absence of reforming and under autothermal partial oxidation conditions comprising a gas hourly space velocity of at least 60,000 $hr^{-1}$.

2. The process according to claim 1 wherein the $H_2O$ is fed with the hydrocarbon and the oxygen to contact the noble metal monolith catalyst.

3. The process according to claim 2 wherein the $H_2O$ is fed to the stream after the noble metal monolith catalyst and prior to the nickel metal monolith catalyst.

4. The process according to claim 1 wherein the catalysts are configured in a multi-bed reactor.

5. The process according to claim 1 wherein the gas hourly space velocity is no greater than 3,000,000 $hr^{-1}$.

6. The process according to claim 1 wherein the catalyst contact time ranges from 0.1 millisecond to 20 milliseconds.

7. The process according to claim 1 wherein the nickel metal monolith catalyst comprises spheres of sintered nickel.

8. The process according to claim 1 wherein the $H_2$:CO ratio produced is more than 2.

* * * * *